US011374989B1

(12) United States Patent
Martin

(10) Patent No.: US 11,374,989 B1
(45) Date of Patent: Jun. 28, 2022

(54) PRESENTATION SYSTEM HAVING LOW LATENCY FEEDBACK

(71) Applicant: Joanne Michelle Martin, Concord, NH (US)

(72) Inventor: Joanne Michelle Martin, Concord, NH (US)

(*) Notice: Subject to any disclaimer, the term of this patent is extended or adjusted under 35 U.S.C. 154(b) by 0 days.

(21) Appl. No.: 17/324,151

(22) Filed: May 19, 2021

(51) Int. Cl.

| | |
|---|---|
| ***H04L 65/401*** | (2022.01) |
| ***H04L 65/1069*** | (2022.01) |
| ***G09B 5/06*** | (2006.01) |
| ***H04L 65/60*** | (2022.01) |
| ***H04L 65/403*** | (2022.01) |

(52) U.S. Cl.
CPC .......... *H04L 65/4015* (2013.01); *G09B 5/065* (2013.01); *H04L 65/1069* (2013.01); *H04L 65/403* (2013.01); *H04L 65/601* (2013.01)

(58) Field of Classification Search
CPC ............. H04L 65/4015; H04L 65/1069; H04L 65/403; H04L 65/601; H04L 12/18; G09B 5/065; H04N 21/4667; H04N 21/252; H04N 21/422; H04N 7/15
See application file for complete search history.

(56) References Cited

U.S. PATENT DOCUMENTS

| | | | | |
|---|---|---|---|---|
| 2009/0138332 | A1* | 5/2009 | Kanevsky | G11B 27/34 705/7.29 |
| 2011/0295392 | A1* | 12/2011 | Cunnington | H04N 7/15 700/90 |
| 2017/0039876 | A1 | 2/2017 | Civici et al. | |
| 2017/0295404 | A1* | 10/2017 | Meredith | H04H 60/33 |
| 2018/0331842 | A1* | 11/2018 | Faulkner | H04N 7/15 |

* cited by examiner

*Primary Examiner* — Glenford J Madamba
(74) *Attorney, Agent, or Firm* — Joanne M. Martin

(57) ABSTRACT

Apparatus and methods of instruction presentations to a 'virtual' audience or students including real-time information formed from observable audience reactions as they receive the presentation material, and further includes apparatus and methods to correlate the detected or missing audience reactions in relation to specific presented material, rapidly prompting the presenter and/or the audience with specific, timely, low-latency feedback. The presenter is alerted (possibly before an audience question can be formulated), and the audience member is prompted that there may be questions or contributions regarding a specific matter as it is presented, whereupon the audience member is given the freedom to join or question (or not). Accordingly, specific information is rapidly conveyed to the presenter who with minimal distraction, becomes better aware of the state of the individual audience member understanding despite the separation from the audience, and the intimidation of the audience or students to engage is significantly reduced.

22 Claims, 3 Drawing Sheets

43
40
50
70
60
62
124
68
42
44
48
46
64
66
Presenter/Teacher
1.Detect Audience Reaction
2.Correlate with Topic Material
3. Communicate w/ Presenter and/or Audience
Audience/Student
30

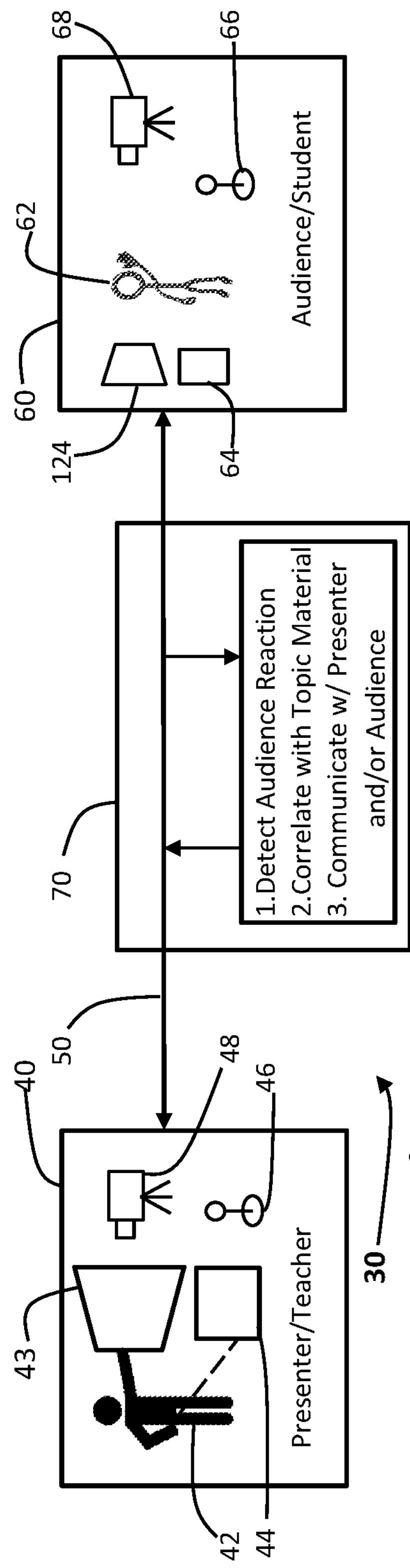
40
43
42
44
48
46
Presenter/Teacher
30
Fig. 1
50
70
1.Detect Audience Reaction
2.Correlate with Topic Material
3. Communicate w/ Presenter and/or Audience
60
124
62
68
66
64
Audience/Student

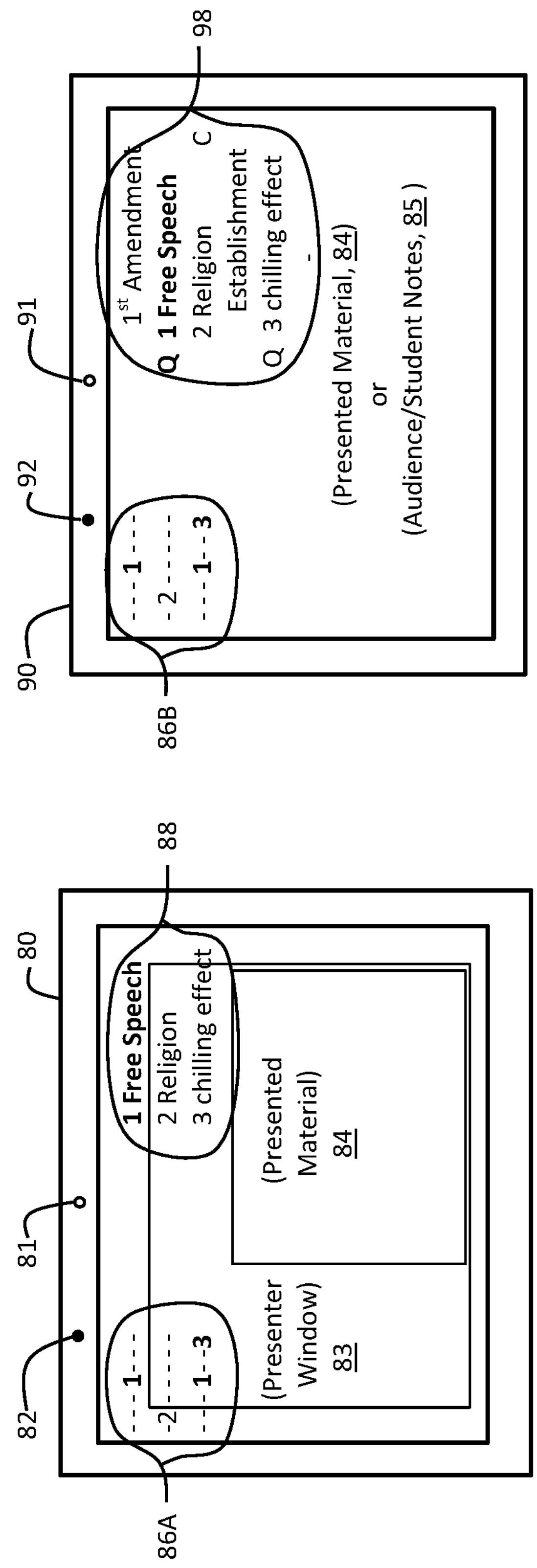
80
81
82
86A
88
1 Free Speech
2 Religion
3 chilling effect
(Presenter Window) 83
(Presented Material) 84
Presenter/Teacher
Fig. 2A
90
91
92
86B
98
1st Amendment
Q 1 Free Speech
2 Religion
Establishment
Q 3 chilling effect
C
(Presented Material, 84)
or
(Audience/Student Notes, 85)
Audience/Student – Rear Row, Middle Seat
Fig. 2B

PRESENTATION SYSTEM HAVING LOW LATENCY FEEDBACK

FIELD OF THE INVENTION

The present invention relates to systems and methods of presenting information from a presenter to an audience, in particular presentation systems and methods for presenting instructional information to a remote audience and providing near real-time presenter and audience feedback useful to guide presentation of instructional information.

BACKGROUND OF THE INVENTION

In settings where the audience is remote from a presenter e.g. 'on-line', and where the audience is fragmented into smaller groups or individual members or students, it is almost impossible for the presenter to observe individual audience members or get subtle nonverbal information from them to sense presentation difficulties as would be available in a live presentation or without delay (latency) in audience feedback to evaluate the effectiveness of the presentation and/or presented material. Moreover, there is also little or no possibility of one audience member asking another, distant audience member for clarification or interaction, as would be available in a congregated audience. Furthermore, the natural social cohesion and mutual support of a live congregated audience or class is inhibited by the lack of a sense of shared experience and nuanced interactions. A skilled presenter or teacher observes that each audience or class is noticeably different and responds differently to the same material and exercises presented, and adjustment must be made. Effective presentation of information by the presenter to an audience or student(s) is reduced and limited if the presenter does not have information from the audience that can be interpreted to reflect their state of assimilation and understanding of the presented information. Since the presented information and/or the context is likely to be new or different, even a competent presenter will suffer the loss of such audience information, especially the subtle audience responses, that reflects any difficulty in information understanding and assimilation, or allow the presenter to quickly review or adjust subsequent presentation to respond to and correct the areas of difficulty of understanding and assimilation of the presented material.

Often where there is audience failure of understanding and/or assimilation, or there are also related questions, or the audience member may want to contribute to the presentation, most audience members will suppress coming forward to indicate concerns or desires, especially if they feel isolated and insecure, or there is a perceive penalty to voice their concerns. In some presentation or learning environments there is a fear of peer judgement and/or the hope that the eventual understanding and assimilation of the material can be 'made up' later. However, if understanding the presented material is cumulative and depends on understanding on previously presented material, acceptable understanding, assimilation, audience participation can fall off rapidly if that previously presented new material is not understood when it is presented. This concern is made worse for isolated audience members, and even more so for audience members having different language or culture backgrounds.

Prior presentation systems or methods may rely on testing to provide feedback to the presenter. However, the delay between presentation and testing, and the significant difference between the mental state of acquiring information and mental state of being tested on information, and the opportunities to remedy problems that inhibit understanding, are small and inefficient. Furthermore, the assumption that learning can be determined by measurements of audience or student engagement, such as discussed in US Patent Application 2017/0039876, "System and Method For Identifying Learner Engagement", as based on aggregated observations and evaluations (which necessarily have delayed results), cannot show the specific part of the presented material that is responsible for the drop or change in audience engagement, or that it is due to lack of understanding, or cannot quickly enough to allow the presenter or instructor to know about and respond to a potential or actual problem of audience understanding and indicate more specifically the topic not understood, or cannot invite student contributions. Moreover, as stated in IEEE Transactions on Computing, Vol 5, Issue 1, January-March 2014, page 12 of the article "The Faces of Engagement: Automatic Recognition of Student Engagement from Facial Expressions", there is no significant correlation between learning and student engagement. Effective presentation and learning or information assimilation is more than mere audience engagement or attention, as an 'engaged' audience member may still not understand the material, or be 'felt' by and respond to the presenter (or presentation system), or have a real-time opportunity to signal a concern, or provide or receive other subtle communication components, necessary for the audience or student to effectively receive and integrate the presented material, especially in on-going (multiple) presentations.

Moreover, some technologically enhanced teaching systems invade an audience's or students' autonomy and privacy, and in some instances, act to compel participation in a manner to cause the audience member or student to retreat or abandon participation in the presentation. Further negative responses can occur by the creation and use of audience profile data that are preserved beyond the duration of the presentation or class, raising privacy issues and (aside from required participant testing or other evaluation) may also cause the audience or student to retreat or avoid participation, and create an unforgiving environment that inhibits audience or student exploration, and to quickly further penalize experiencing the necessary failures that may naturally occur in effective presentation or instruction.

SUMMARY

The present invention provides apparatus and methods of sending presentation material and information to an audience or student(s), and retrieving information from the audience or student(s) based on detectable, observable or measurable indications as the audience or student(s) receive the presentation material and information, and further includes apparatus and methods responsive to present a detected change in the observable or measureable indications in relation to a representation of the presented material and information (e.g. on the presenter/teacher and audience/student screen), allowing and prompting the presenter and/or the audience with low-latency audience or student feedback to select and indicate in real-time, concern about the presented material or information presented. The prompting arises from the determination of an abrupt (or otherwise noticeable) change in body position or other observable trait in one or more audience members or students and correlation to one or more topics the material currently and recently presented. According to embodiments of the present invention, the observable traits that trigger presenter prompting may or may not be categorized, and may be correlated empirically, and may be retained suitable storage medium for future reference, and the stored correlations and other data may also be deleted according to audience or student privacy requests. According to the present invention, such behaviors or reaction may include a change in kind and/or change in intensity of audience member(s) other features such as facial expressions, expressed emotions, confusion, member emitted audible sounds, etc. Furthermore, embodiments of the systems and methods according to the present invention may include corresponding condition or event detectors, trainable networks or systems (resident in or associated with one or more of the various processors included in the present invention, described below), which can detect, adjust and/or remember various processsing coefficients, data, such as determination thresholds, preferences, correlations, events and behavior patterns according to audience member and/or information topic presented.

The selection and indication of concern of one audience member or student may be anonymously (or identifiably) and immediately shared with other audience members, indicating whether they have a problem of understanding or application of the material, or whether they wish to discuss it, or if they wish to make a contribution to the topic. The audience or student may also decline to make any selection or indication of concern. The audience member or student may select (or not and choose to remain anonymous) from summarized topics indicated on the audience or student screen, by keyboard or other manual entry, or audience body motion. The presenter is then provided a simplified representation of the audience or student selected summarized topic (e.g. a sentence fragment on the presenter screen for each topic flagged as describe below), to facilitate immediate presentation clarification during the presentation or class time period. Alternate embodiments allow the presenter or teacher to place a plurality of topics on audience/student screens for selection.

Having been prompted regarding a specific matter and given the freedom to join the alert of a topic question, the reluctance of the audience or students to express their concern (e.g. question or contribution) is significantly reduced as trust is gained, and specific information can be rapidly conveyed to the presenter without requiring the audience member to interrupt their note-taking or other participation to make a separate memo to the presenter. As a result, the presenter can overcome much of the penalty of separation from the audience or student(s) and provide a near-real time response, review or amplification of the topic that raised the concern revealed by a detected change in student position or behavior that may be correlated to a real-time flow of information from the presenter. Moreover, according to an embodiment of the present invention, one audience member may privately share their concern with other audience members or students, and/or the specific presenter responses to indicated presentation topic, the feelings of class isolation and reluctance is reduced and failure to understand the presented material is reduced, and audience members or students may engage in participation at a rate of their own choosing.

An embodiment of the components of the present invention includes placing hardware and/or software elements within existing presenter and audience devices (e.g. computers, presentation software) and/or between the existing presenter an audience devices along the communication link(s) therebetween. However, to further reduce system latency (time between event and report or response), alternate embodiments include one or more components of the system according to an embodiment of the present invention may be separated and embodied into one or both presenter and audience processors (computers), or into separate external hardware connected to the presenter and/or audience device to include processing and other operations and minimize delays in system operation. According to an embodiment of the present invention, the information provided by the present invention may be displayed as an overlay of screen images from existing systems, software or data, or may be displayed on displays in addition to displays of the existing presentation and/or teaching systems. Furthermore, the methods and apparatus of individual audience observation and determination of behavior are enhanced by learning, pattern recognition, etc., and for enhanced privacy and security, be retained on devices or data retained by the devices and/or software associated with each individual audience member or student, as meta information (no individually identifiable information), or deleted at the end of each presentation. Further embodiments of the present invention include the media on which some or all of the instructions which provide the systems and processes described and claimed herein.

BRIEF DESCRIPTION OF THE DRAWINGS

These and further features of the present invention will be better understood by taking the following Drawing figures together with the Detailed Description, wherein:

FIG. 1 is a block diagram of one embodiment of the present invention;

FIG. 2A is an illustration of an exemplary Presenter/Teacher presentation screen embodiment;

FIG. 2B is an illustration of an exemplary Audience/Student screen embodiment;

DETAILED DESCRIPTION

Figure 3:
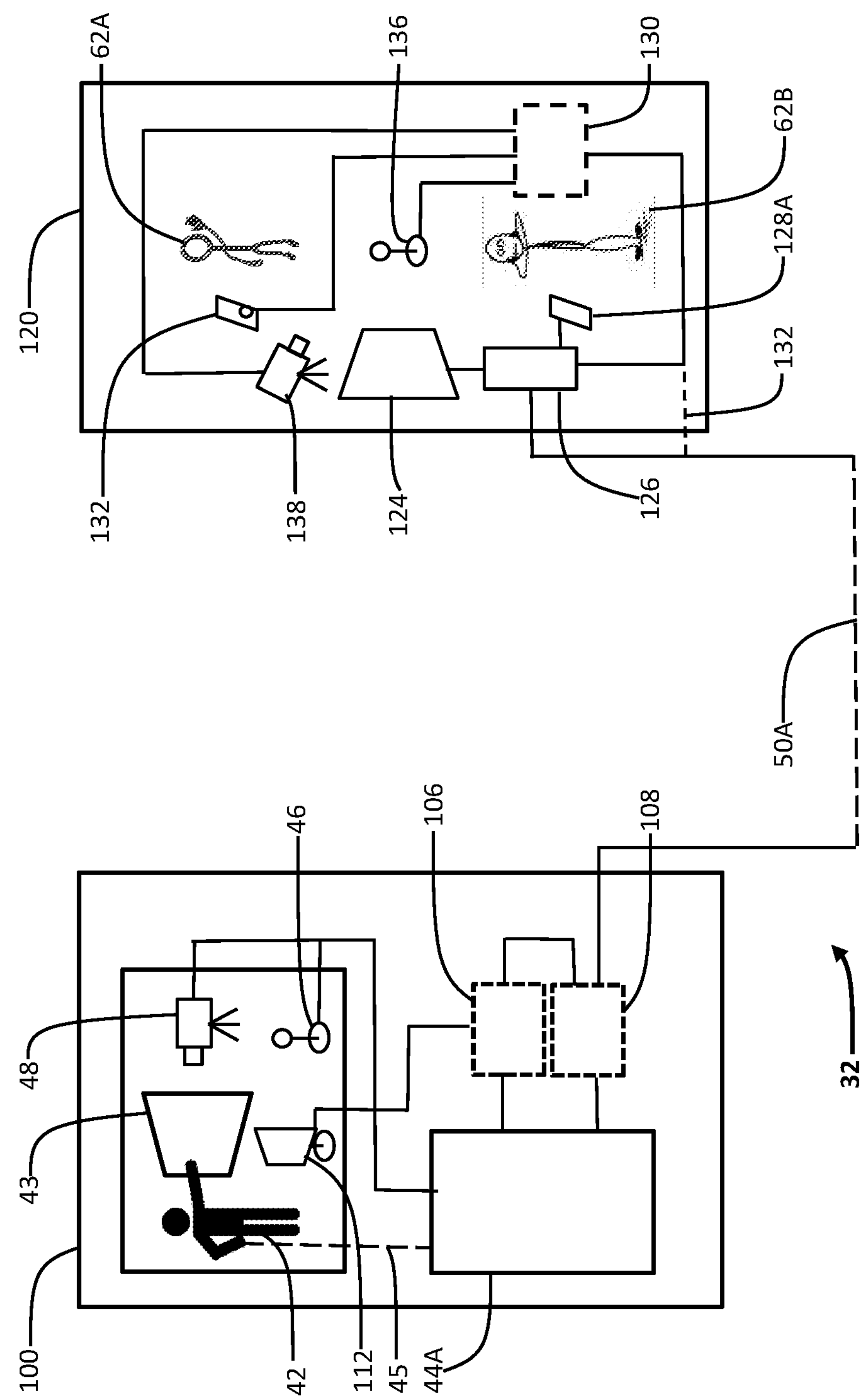
FIG. 3 is an embodiment of the present invention including a remote venue/classroom and plural audience members/students co-located in that remote venue/classroom.

In an embodiment 30 according to the present invention, a presenter (or instructor, teacher, etc.) 42, FIG. 1, located at presenter venue 40 may be separated from the audience (or student) venue 60 connected by bi-directional communication link 50 comprising internet, RF (radio), optical or other connection or link 50 (may include analog audio and video) that permits data communication between venues 40 and 60. Typically, the presenter venue allows the presenter 42 to electronically or via camera 48 and microphone 46, present live (serial) information and from a screen or board 43 to the remote audience (or recording apparatus, not shown). To facilitate the presentation of the desired information, the presenter 42 often relies on observation (by sight and/or sound, etc.) of the audience at venue 60 and its behavior including reaction to the received information. According to an embodiment of the present invention, the information from the presenter 42 is typically conveyed on connection 50 by audio, video, and/or data representation of the presenter 42 to the audience 62 via processor 44 which provides the appropriate interfacing and processing (and in some embodiments according to the present invention, additional processing as described below), and an added audience reaction monitor 70 receives presenter and audience information via connection 50 (or directly from either venue 40 and/or 60) from the audience venue 62 that reports or interprets the observable, via camera 68 and/or microphone 66 raw output signals, physical behavior and reaction (or response or disturbance) of the audience 62 to information from the presenter 42, and communicates and/or characterizes the audience 62 behavior or response, forwarding data representations of that characterization to the presenter 42 via the connection or link 50 or by another communication channel (not shown). The audience monitor 70 may further monitor the presented information from the presenter 42 to the audience venue 60, provide a summary of the presenter 42 information, and forward that summary to the audience venue 60, and/or compare or correlate the audience 62 behavior or response (and/or other functions according to the present invention) and send a result of that comparison or correlation to the audience 62 and/or the presenter 42. The information presented by the presenter may also include non-serially presented information data, graphics, audio, video and other non-serial information and processed accordingly. Exemplary examples of presentation of summary and comparison/correlation information are provided in FIGS. 2A and 2B.

Figure 4:
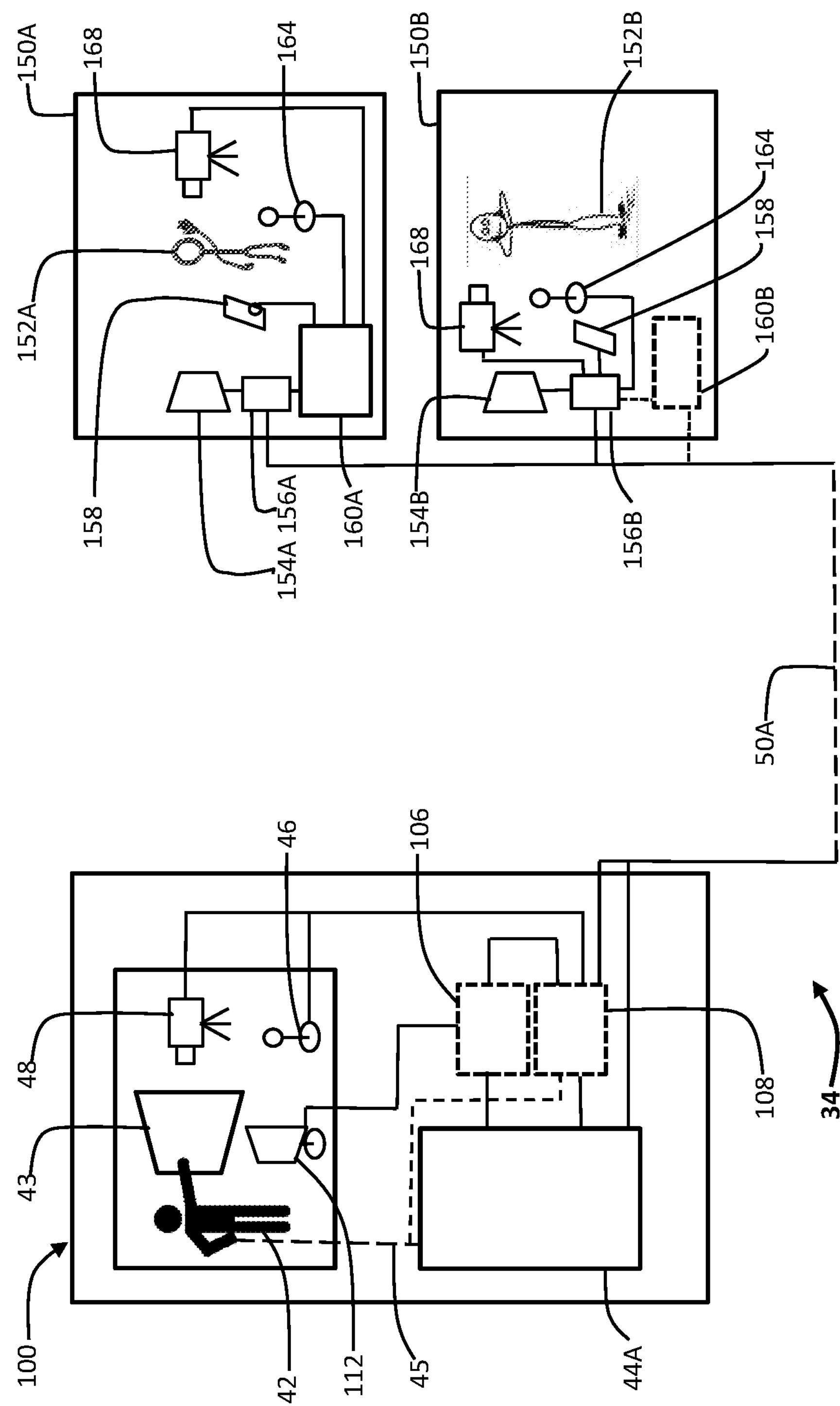
FIG. 4 is an exemplary embodiment of the present invention including a representative separately located remote audience member/student.

Embodiments according to the present invention include a single reaction monitor 70 connected to the link 50, typically at or close to either the presenter venue 40 or the audience venue 60, or separated into multiple monitor processors as resident at both the presenter venue 40 and the audience venue 60, and/or at each of multiple audience venues (e.g. for individual students). Exemplary embodiments of particular distribution of monitor functions at the monitor processors are shown in FIGS. 3 and 4. Moreover, embodiments of the reaction monitor 70 or components thereof may include trainable structures to customize responses to individual audience members characteristics and behaviors (e.g. individual response time window).

According to an embodiment of the present invention, information from reaction monitor 70 internal processors are presented on a separate display(s) 46, 66, or as an overlay on existing presentation system programs by software integration (or by a hardware combiner inserted before the presenter (e.g. 106, FIG. 3) and/or audience monitor (112, 124) as shown in exemplary display screens 80 and 90, in FIGS. 2A and 2B respectively. The presenter screen 80 (and corresponding system hardware and software) includes and displays the presenter material 84 to be presented to the audience and appears on the audience screen 90 as image 84 (e.g. embodiment 32, FIG. 3) via corresponding hardware and software, and in embodiments where the presented material (84) is presented by a separate display (e.g. 124 in FIG. 3) and an audience computer includes or connects to a second display (90, FIG. 2B) that includes the audience notes 85, the information overlays may be presented on either or both display 84, 85. In some embodiments, the presenter's screen 80 may include additional information 83 (via corresponding software and hardware such as PowerPoint™) as conveyed to the audience. During the presentation, the substance and topics presented are summarized, transferred and/or extracted from the presenter's material, e.g. 'reading' the text of 'presented material', interpreting the audio and visual information of the presenter via laptop computer (or equivalent) microphone 82, camera 81 or otherwise, and words or symbols (understood by audience to signal a topic) are copied from presenter text and/or images, transcribed from audio by 'closed captioning' systems, or equivalent, and conveyed to the audience display 90 and successively presented as an overlay 98 (or separately) adjacent to or added over the presented material 84. In one embodiment, a reaction by or disturbance of the corresponding audience member is detected by a reaction monitor according one of the embodiments of the present invention, from audio and/or visual information by an audience camera, e.g. 91 and/or microphone 92, or equivalent, and the information provided in the overlay is responsive to the audience, and the presenter may be alerted by a corresponding selected audio sound or tone. According to one embodiment, the audience member may signal interest to the presenter and/or other audience members by simply selecting (on a screen, by keyboard or mouse or laptop) an extracted text or graphic portion of the presentation (e.g. by high-lighting and striking 'enter') or may further respond if they have a 'concern' such as a question (e.g. mark presented overlay information with "Q") or wish to make a comment (mark with "C"), whereupon the corresponding topic in overlay 98 is marked "Q", "C" (or other indicator for other reactions) and given a number. Corresponding information of theses topic markings are conveyed to the presenter and added as an overlay 86A (or separately) as a graphic indication of the audience venue 90 physical seating layout and number corresponding to a question of comment, and an overlay 88 (or separately) indexing the topic and the number displayed in location overlay 86A that have been marked by the audience 62, and optionally in a corresponding overlay 86B of the audience screen 90 which allows audience members to see the concerns of other (co-located) audience members. Moreover, the presenter may be alerted by such audience responses with a selected corresponding unique audible sound or tone. As a further feature of the present invention, such information to the audience members permits and encourages audience interactions directly (with or without the use of monitor-conveyed information) at the shared audience venue.

According to an embodiment, the presentation of topics having a detected audience reaction are displayed to several of the separated or co-located audience 98 to help overcome reluctance or distraction of interrupting the presenter, and gives the presenter a near-real-time indication of audience questions or comments, the number of audience members having a particular related or common concern, and the physical audience location of the concerned audience member within a shared audience venue. Accordingly, greater presentation intimacy and presenter responsiveness, and the ability of the presenter to enhance presentations by immediately addressing audience concerns that would otherwise detract from audience understanding and integration of the presented material. Moreover, the audience concerns that are identified and signaled to the presenter 86A according to an embodiment allows the presenter to mentally compose a particular or aggregate response and decide if and when to provide that response to the audience during the remaining presentation time, or by additional material outside of the presentation, or otherwise.

According to one embodiment, the presentation 98 of topic information is summarized or reduced to words or symbols, or unique audible cues that are understandable by the audience as corresponding to a particular topic or matter and are generated by the monitor 70 (a single or distributed software and/or hardware module) or directly from the systems associated with the presenter 42 and/or presenter venue 40, and visually provided to the audience 98, typically in order of the occurrence of presentation by the presenter 42. In a further embodiment, a reaction or disturbance by a member of the audience will be detected by the monitor 70 before the corresponding items (e.g. 98) are provided to the audience 64 screen 90. Recognizing that there are often times that an audience perception to presented information, and corresponding reaction to a topic may be delayed, the identification of a disturbance may further trigger inclusion in display 98 of several immediately prior presenter 42 topics to which the audience may select according to the present invention. Also, any relationship detected or inferred between presented information and audience reaction may also be observed within a time window (e.g. 10 seconds or less) before audience member reaction to accommodate any delay in cognition and response by the audience member.

According to an embodiment of the present invention, the reaction monitor 70 includes a process function of and/or hardware for detecting a reaction of or disturbance in the audience that may include detecting a particular body position or change thereof, a particular facial expression (including eye description) or change or significant lack of change thereof, and/or sounds originating from the audience or particular member or change(s) thereof. In an embodiment of the present invention, the corresponding implementing software and/or hardware (e.g. 126, 160A, 160B) is/are located in or near the audience venue(s) as shown in exemplary embodiments 32 and 34 of FIGS. 3 and 4. While accurate and reliable determination of particular forms of audience disturbance response is useful, the indication of any measurable audience response to presented material of a selected threshold amount is useful to initiate response(s) according to the present invention to offer a menu or list of recent topics to the audience member to select and mark a concern, question, request to participate, etc. In addition to the audio or visual monitoring, other technologies may be used as applicable to enhance the options and accuracy of interactions at the particular venue and with the particular participants. While not implying pathology to the participants of the present system, a useful summary "Sensing Technologies for Monitoring Serious Mental Illnesses", IEEE Multimedia, January-March 2018, pages 61-75, provides additional means of determination of significance of audience reaction or disturbance (e.g. preoccupation, distraction, sadness, boredom) that may be conveyed to the presenter via presenter screens, e.g. 112, etc.), and is incorporated by reference.

Also included in an embodiment of the present invention, the monitor includes software and/or hardware to parse, copy text symbols, compare, correlate, or otherwise identify the substance of the presented matter that is stored or presented by the presenter 42, and in further embodiments is identified substantially as the presenter 42 presents or conveys the information via link 50 to the audience venue 60, or shortly thereafter. The resulting information product is sent to at least the audience venue 60 and/or individual members to populate the display region 98 as described elsewhere. In other embodiments of FIGS. 3 and 4, these functions and structures (e.g. 108) may be located proximal to the presenter 42 or presenter venue 40 or elsewhere along the link 70.

A further embodiment of the present invention includes a processor having comparison and/or correlator software and/or hardware receiving both the signals reflecting particular detected audience reactions, responses, or disturbance(s) and the identified presenter information, and forwards a representation of a coincidence of the identified presenter information (topic) and the detected audience disturbance as a part of the display 88 to the presenter and/or display 98 to the audience. The presenter may notice the identified topic in the display 88 and re-visit the topic for more detailed discussion, explanation, audience contribution, etc. or ignore it. As discussed above, the audience 62 member may mark (e.g. with "Q" for question, "C" for comment, etc.) one or more such parts of the display, and according to one embodiment, the marked parts of the display 98 will be forwarded to the presenter display 80 to be displayed 88 with the corresponding mark, and initiate a display of the audience member(s) location in a simple seating graphic overlays 86A, 86B. In other embodiments of FIGS. 3 and 4, these functions and structures may be located proximal to the presenter 42 or presenter venue 40 or elsewhere along the link 70 or also part of extractor 108.

Once the representation of the presenter's information is presented at audience overlay 98 (or sidebar, etc.), the audience member may place a marker (e.g. "C" and/or "Q") sufficiently close the topic to indicate or flag a desire to make a comment or understanding concern of that particular topic, and a unique marker (e.g. number, symbol, etc.) will be assigned and juxtaposed thereto. Further embodiments provide the placement of a marker proximal to a portion (word, image, sound file track) elsewhere on the display 84 of the presented material. A corresponding presenter overlay (or sidebar, etc.) display is provided on the presenter screen 80 (or separately). In one embodiment, the presenter display 88 will only include the topic to which an audience member has indicated a concern by placing a marker. An alternate embodiment may place an indicator number on a corresponding portion of the presenter's presented material 84 and/or seating graphic overlay 86A, 86B.

After an audience 62 member has indicated a concern or desire on a particular topic, a further display 86A is provided to the presenter via overlay (or adjacent or nearby display) with a graphic representation of the layout of the audience and numbers (or other graphic indicator) corresponding to topics of display 88. For instance, in the example of FIG. 2A, three rows of 7 dashes, except for numbers 1, 2, 1, and 3, are shown, corresponding to a physical layout of the members of audience venue 60. Other embodiments may also indicate the names of the audience members corresponding to question numbers. The location of the numbers in the display 86A corresponds to the location of the member of the audience 62 (plural audience member layout not shown in FIG. 1), and the topic (1, 2, and 3 from display 88) number or graphic displayed in that location (instead of a dash or other neutral place-holder indicator). In further embodiments, the displayed graphic (in 86A) can be modified (e.g. emboldened) to convey additional information, e.g. an audience comment or question. Accordingly, a presenter 42 can receive near real-time indication of audience concerns and identify the individuals having the concerns. Further embodiments also include a similar display 86B on the audience screen 90 viewable by a plurality of members of the audience 62 to alert an member of others who share the concern, and furthermore can thereby foster interaction between any co-located members within the audience venue 60 or further remote venues (e.g. FIG. 4).

A representative further embodiment 32 according to the present invention have distributed components of the monitor 70 of FIG. 1, is shown in FIG. 3 within the presenter venue 100, wherein the presenter 42 may present information with a traditional blackboard/whiteboard, or electronic display surface 43, the image of which can be provided electronically by camera 48 or other conversion apparatus or methods, as well as providing a signal from the sound of the presenter by the microphone 46 (or 82 of FIG. 2A) or other conversion apparatus or methods, and send via processor 44A to the audience venue 120 via communication link 50A that may include wired, wireless, optical and/or applicable media capable of providing a bi-directional data flow between presenter venue 100 and audience venue 120. The processor 44A typically comprises computer/processor controllable 45 by the presenter 42 to provide a flow of data that represents the information or lesson(s) in the form of images, data, text, and/or audio signals to the audience venue 120. The presenter may run programs providing images to a display 112 for observation and/or presenter interaction (e.g. via a 'touch screen' component of the display 112), or the display 112 may comprise a projector providing images of the presented subject matter on the surface 43. According to one embodiment, the data from the processor 44A is sent through a distributed portion 108 of the monitor (70, FIG. 1) then to the communication link 50A, wherein the stream of data is intercepted and converted into displayable symbols (e.g. text, symbols) to be sent via link 50A to audience venue for display to the audience members 62A, 62B, and further may include a formatting system suitable to provide displayable symbols to a image signal combiner 106 which overlays or combines the displayable symbols with the graphic output of the processor 44A to be displayed on the screen 112 upon selection by the audience 62A, 62B according to the present invention as described elsewhere herein, and corresponding selections signals sent back to the processor 44A via link 50A. In alternate embodiments, the portion 108 extracts information from the normal flow of data from the processor 44A and may receive the text (e.g. as Microsoft WORD document) from the processor 44A, or may be located at the audience venue 120.

A group or audience congregation of members, e.g. 62A, 62B (or more), at the same physical space or venue 120 typically observe a common display 124 having a flow of information from the presenter 42 via link 50A and audience venue 120 processor 126, upon which the presenter's information or lessons are observed by the audience members 62A, 62B. According to one embodiment, the audience members perform routine activities, e.g. quiet movements while taking notes, faces oriented to observe the presentations on display 124 and hear presenter audible presentations from an attached speaker or headphones. A detecting the audience disturbance portion 130 of the monitor (70, FIG. 1) is located with or near the audience and receives information and input via keyboard/switch 132 control, microphone 136 signals and/or camera 138 signals of the audience during the presenter 42 presentation, and provides a corresponding signal to the presenter venue 100 via link 50A. According to one embodiment of the present invention, when a reaction, disturbance pattern, or audience activity is detected and determined by the detecting portion 130 from received input signals or information, e.g. by camera 138 and microphone 136 located to capture the audience participants' 62A, 62B, etc. behavior, contributions and/or expressions, and the resulting signal is used by the processor 44A and/or extractor 108 to send text, graphic, or audible information to the audience venue representing the information presented at corresponding time and manner of audience reaction or disturbance, whereupon the audience member may mark or select one or more of the text or graphics as described elsewhere herein, which selection is sent to the presenter display(s) according an embodiment of the present invention, including presenting the text or graphic to the main venue display 124 via venue processor 126, and/or to individual audience laptop computers (or equivalent) that include or attach to keyboards 128 for audience selection and interaction. In alternate embodiments according to the present invention, the extractor portion 108 of presenter venue 100 may reside at the audience venue 120 and be combined with detecting portion 130, returning a signal via processor 124 or directly 132 to the processor 44A or combiner 106 to provide the visual indication on a display, e.g. 112, to the presenter 42 of audience selected topics, etc. While embodiments can be configured to overlay or be added to existing communication and educational structures without interference of other communication and educational presentation apparatus and methods, further embodiments according to the present invention may integrate the hardware structures 106, 108, 130, etc., and corresponding functions within or with previously used existing structures, e.g. processors 44A and 126 by software and/or hardware additions or modifications.

A representative alternate embodiment 34 according to the present invention have distributed components of the monitor 70 of FIGS. 1 and 3, is shown in FIG. 4 within the presenter venue 100 as shown in FIG. 3, wherein the presenter 42 may present information with a traditional blackboard/whiteboard surface or electronic display 43, the image of which is provided electronically by camera 48 or other conversion apparatus or methods, as well as providing a signal from the sound of the presenter by the microphone 46 (or 82 of FIG. 2A) or other conversion apparatus or methods, and in the embodiment 34, send via processor 44A to one or more audience venues 150A, 150B, etc. such a with individual audience or students 152A, 152B, etc. via communication link 50A that may include wired, wireless, optical and/or applicable media capable of providing a bi-directional data flow between presenter venue 100 and audience venues 150A, 150B, etc.

According to the embodiment 34, each audience venue 150A, 150B, etc., includes a processor such as a laptop 156A that may include or be connected to a display 154A, or a larger (e.g. 'tower') computer 156B and a corresponding display 154B, and except where indicated elsewhere herein, the type of processors 156A, 156B are interchangeable. Similar to the audience detecting portion 130 of FIG. 3, the audience venues 150A, 150B, etc. of embodiment 34 may include an audience response detecting processor portion 160A that receives signals from audience monitor devices such as microphone 164, camera 168, keyboard/switches 158, etc. and connects such signals to the processor 156A from which audience member 152A reactions and/or disturbances are detected and corresponding signals are generated for transmission to the to the presenter venue 100, and the corresponding signals for overlays (e.g. 86B, 98 of FIG. 2B) are provided by the processor 44A or distributed monitor portion 108 returned via link 50A. The audience response detecting processor portion 160A of embodiment 34 of FIG. 4 may receive a stream of the presented material or a flow of data that represents the information or lesson(s) in the form of images, data, text, and/or audio signals to the audience and provide the corresponding signals for overlays (e.g. 86B, 98 of FIG. 2B) to the processor 156A to be shown on display 152A, (or similarly by audience response detecting processor portion 160B for audience venue 150B, when signal derived from audience monitoring are received by processor 156B to be shown on display 154B.

As may be determined by considerations such as implementation costs, size, licensing, etc., the novel structures and methods first, to detect audience reactions, responses, and/or absence of expected response, that may be correlated to particular audience responses to presented material as it is presented, and/or audience member discussions, questions or initiatives as they may occur, second, to correlate detected audience responses and/or disturbances with particular identifiable topic material, and third, to communicate the correlations and/or audience reactions to such correlations to the presenter and/or audience member to invite and enhance audience/presenter interactions, may be preferably made discussed herein, alternate distributions of such structures and methods among the presenter and audience venues may be made according to the present invention. Further embodiments include an audience monitor (typically part of one of the processors or detectors with structure and/or programming to receive existing or separately provided) audio signal representations) that includes a presenter voice response detector and/or audience voice response detector receiving and discerning at least one of corresponding presenter or audience member voiced audience monitor commands, selections, and controls otherwise provided according to the present invention.

According to a feature of the present invention, the above-described components are connected to and configurable to be compatible with existing presentation and/or educational structures and systems. The term 'representation' includes the direct physical phenomenon and any conversion of, symbol of, data conversion of, alternate physical embodiment, etc. as may be understood or have meaning or correspondence by a being or system of, in or associated with the present invention, such as (but not limited to) digitized audio and video, and conversions back to their native or other analog or physical format. When adapted for use with asynchronous (not live) programmed instruction, or recorded lectures, a detected problem topic may also be used to trigger a remedial intervention (e.g. an interruption in an automated or "asynchronous" presenter presentation and initiation of a lexicon or other amplification of the selected topic, or providing clarifying or amplifying material or interactions, etc.) or when viewed by a group, a response by another member of the group to provide clarification of the topic, etc., or advancement or enrichment of materials presented upon detection of particular audience responses, e.g. boredom, are detected, which may be independently developed and applied for the presentation according to a further alternate embodiment of the present invention. Also included in the present invention are embodiments having audible/audio presentations and/or audience responses together with or in lieu of visual presentations and/or audience responses. As the methods and structures according to the present invention become popular and universally used, they are also integrated within presentation and/or educational structures and even with live in-class settings without departing from the features as claimed. Further modifications and substitutions by one of ordinary skill in the art are within the scope of the present invention.

What is claimed is:

1. A presentation system, for use with a presenter information source of information being presented to at least one audience destination having an audience member at a destination location and coupled together by a media connection therebetween, receiving said presenter information, and comprising:

an audience monitor including a detector connected to receive and discern an audience reaction comprising at least one of physical behavior, disturbance, response, reaction, which are observable via camera or microphone; and a detected audience selection or input; and to provide corresponding information or the detected audience reaction and detected audience selection or input as unprocessed audience output signals, together with a corresponding detected audience destination location from said at least one audience destination member while said audience destination is receiving said presenter information, and therefrom, provide during said presentation of said presenter information by said presenter, the unprocessed audience output signals corresponding to each said received and discerned audience reaction representing said at least one of physical behavior, disturbance, response, reaction observable via camera or microphone, and said detected audience selection, and said detected corresponding audience location; and a processor receiving the said unprocessed audience output signals and connected to present as overlay information in a presentation system display of the presenter and audience member, and in real-time while said presenter is presenting said information, a discernable indication to said presenter information source that provides an independent indication representing a corresponding said unprocessed audience output signal of at least one of said detected audience physical behavior, disturbance, response, or reaction observable via camera or microphone, of said detected audience selection or input, and of said detected corresponding audience location, concurrent with a discernable indication to said presenter information source, of the presenter information associated with or correlated with said at least one of said detected audience observable audience destination physical behavior, disturbance, response, reaction, and detected audience selection.

2. The presentation system of claim 1, wherein said audience monitor is connected to said media connection.

3. The presentation system of claim 1, wherein at least one of said presenter information source and said audience destination includes at least a portion of said audience monitor.

4. The presentation system of claim 1, wherein said detector discerns at least 2 one of a change in kind and change in intensity, of at least one of body position, audible output, and absence of expected response.

5. The presentation system of claim 4, wherein said detector is a trainable detector capable of providing custom discernable information for individual audience destination members.

6. The presentation system of claim 5, wherein said discernable information includes at least one of a viewable representation of said discernable indication, an identification of said audience destination member having said discernable indication, and an audible indication.

7. The presentation system of claim 6, wherein said discernable indication of said presenter information source information comprises a presenter information monitor providing a flow of text or graphic representations of said presenter information, wherein said processor receiving said audience reaction indication further receives said flow of text or graphic representation, and said processor providing detection of a relationship between said audience destination member audience reaction and a portion of said flow as a corresponding detection signal sent to at least one of said presenter information source and said audience destination.

8. The presentation system of claim 7, wherein said detected relationship includes the detection of the occurrence of said audience destination member audience reaction and the occurrence of said portion of said flow to at least one of said presenter information source within a selected time window.

9. The presentation system of claim 8, wherein said detected relationship further includes the detection of the occurrence of said audience destination member audience reaction among a plurality of audience destination members.

10. The presentation system of claim 7, wherein said audience destination further includes indication of at least a portion of said flow of text or graphic or audio information having a detected relationship, said indication being provided to at least one said audience destination member.

11. The presentation system of claim 10, wherein indication is an indication on a graphic screen associated with at least one of said presentation source and said audience destination member, and said audience monitor receives an audience member selection signal from said at least one of said audience destination member indicating selection of said indication.

12. The presentation system of claim 11, wherein said audience monitor provides said audience member selection signal to said presentation information source, including a portion of said flow of text or graphic information associated with said detected relationship.

13. The presentation system of claim 4, wherein said detector discerns, relative to a threshold, an amount at least one of a change in kind and change in intensity, of at least one of body position, audible output, and absence of expected response.

14. The presentation system of claim 1, wherein presentation information source includes a graphic screen, and said processor provides said discernable indication to said presentation information source graphic screen of a particular audience destination member audience reaction.

15. The presentation system of claim 1, wherein said audience monitor includes a presenter voice response detector and/or audience voice response detector receiving or discerning at least one of corresponding presenter or audience member voiced audience monitor commands, selections, and controls.

16. A presentation method, for use with presenting information from a presenter information source, and receiving said presenter information by at least one audience member at an audience destination by said audience member at a corresponding location of said destination, and providing a media connection therebetween, comprising:

audience monitoring, including detecting by receiving and discerning an audience reaction comprising at least one of physical behavior, disturbance, response, reaction, which are observable via camera or microphone, and a detected audience selection or input; and providing corresponding information or the detected audience reaction and detected selection or input as unprocessed audience output signals, together with a corresponding detected audience destination location from said at least one audience destination member while said audience destination is receiving said presenter information, and therefrom, providing during said presentation of said presenter information by said presenter, said unprocessed audience output signals each corresponding to each said received and discerned audience reaction representing said at least one of physical behavior, disturbance, response, reaction observable via camera or microphone, and said detected audience selection, and said detected corresponding audience location, and processing said unprocessed audience output signals, and presenting as overlay information in a presentation system display of the presenter and audience member, and in real-time while said presenter is presenting said information, a discernable indication to said presenter information source that provides an independent indication representing a corresponding said unprocessed audience output signal, of at least one of said detected audience physical behavior, disturbance, response, or reaction observable via camera or microphone, of said detected audience selection or input, and of said detected corresponding audience location, concurrent with a discernable indication to said presenter information source, of the presenter information associated with or correlated with said at least one of said detected audience destination physical behavior, disturbance, response, or reaction, and detected audience selection.

17. The presentation method of claim 16, further including providing a flow of text or graphic representations of said presenter information from a presenter information monitor, wherein said presenting of the said unprocessed audience output signals further includes receiving said flow of text or graphic representation, and providing detection of a relationship between said audience destination member at least one of physical behavior, disturbance, response, and reaction, and a portion of said flow to at least one of said presenter information source and said audience destination.

18. The presentation method of claim 17, wherein said audience destination further includes indicating to an audience destination member at least a portion of said flow of text or graphic information having said detected relationship, and receiving indication of selection of said audience destination member of said portion of said flow of text or graphic information having said detected relationship.

19. The presentation method of claim 18, further including altering said presenting information from a presenter information source in response to receiving indication of selection.

20. The presentation method of claim 17, wherein said audience destination further includes at least one of indicating to an audience destination member not having said detected relationship, at least a portion of said flow of text or graphic information, and receiving indication of selection from said audience destination member not having said detected relationship, of said portion of said flow of text or graphic information.

21. The presentation method of claim 16, further including receiving and discerning at least one of presenter or audience member voiced audience monitor commands, selections, and controls for commands, selections or controls.

22. A computer program product comprising a non-transitory computer-readable storage medium having instructions encoded thereon that, when executed by a processor, cause the processor, to:

detect by receiving and discerning an audience reaction comprising at least one of physical behavior, disturbance, response, reaction, which are observable via camera or microphone, and a detected audience selection or input; and provide corresponding information or the detected audience reaction and detected selection or input as unprocessed audience output signals, together with a corresponding detected audience destination location from said at least one audience destination member while said audience destination is receiving said presenter information, and therefrom, provide during said presentation of said presenter information by said presenter, said unprocessed audience output signals, each corresponding to each said received and discerned audience reaction representing said at least one of physical behavior, disturbance, response, reaction observable via camera or microphone, and said detected audience selection and said detected corresponding audience location, and processing the said unprocessed audience output signals, and presenting as overlay information in a presentation system display of the presenter and audience member, and in real-time while said presenter is presenting said information, a discernable indication to said presenter information source that provides an independent indication representing a corresponding said unprocessed audience output signal, of at least one of said detected audience physical behavior, disturbance, response, or reaction observable via camera or microphone, of said detected audience selection or input, and of said detected corresponding audience location, concurrent with a discernable indication to said presenter information source, of the presenter information associated with or correlated with said at least one of said detected audience destination physical behavior, disturbance, response, or reaction, and detected audience selection.

* * * * *